US005352523A

United States Patent [19]

Zurecki et al.

[11] Patent Number: 5,352,523

[45] Date of Patent: Oct. 4, 1994

[54] GRAPHITE/CARBON ARTICLES FOR ELEVATED TEMPERATURE SERVICE AND METHOD OF MANUFACTURE

[75] Inventors: Zbigniew Zurecki, Macungie; Edward A. Hayduk, Jr., Blandon; John G. North, Pottstown; Robert B. Swan, Bath; David L. Mitchell, Jr., Coopersburg, all of Pa.

[73] Assignee: Air Products and Chemicals, Inc., Allentown, Pa.

[21] Appl. No.: 880,278

[22] Filed: May 8, 1992

Related U.S. Application Data

[62] Division of Ser. No. 715,169, Jun. 14, 1991, Pat. No. 5,254,359, which is a division of Ser. No. 360,564, Jun. 2, 1989, Pat. No. 5,304,417.

[51] Int. Cl.[5] .......... C04B 41/06

[52] U.S. Cl. .......... 428/408; 219/121.11; 219/552; 219/553; 313/352; 313/355; 428/332; 428/697; 428/698; 428/699; 428/704

[58] Field of Search .......... 428/704, 698, 408, 699, 428/697, 332; 219/552, 553, 121.11; 313/352, 355

[56] References Cited

U.S. PATENT DOCUMENTS

| | | | |
|---|---|---|---|
| Re. 32,111 | 4/1986 | Lambert et al. | 428/699 |
| 1,098,794 | 6/1914 | Fleming | 428/367 |
| 3,771,976 | 11/1973 | Wakefield | 428/698 |
| 4,469,801 | 9/1984 | Hirai et al. | 428/446 |
| 4;525,415 | 6/1985 | Porat | 428/698 |
| 4,540,596 | 9/1985 | Nimmagadda | 427/37 |
| 4,599,281 | 7/1986 | Schintlmeister et al. | 428/698 |
| 4,675,206 | 6/1987 | Ikegaya et al. | 427/38 |
| 4,753,854 | 6/1988 | Gavrilov et al. | 428/698 |

FOREIGN PATENT DOCUMENTS

| | | |
|---|---|---|
| 56-17914 | 2/1981 | Japan . |
| 59-39784 | 3/1984 | Japan . |

OTHER PUBLICATIONS

Beensh-Marchwicka et al "Structure of Thin Films Prepared by the Cosputtering of Titanium and Aluminium or Titanium and Silicon" Thin Solid Films, 82(1981) pp. 313-320.

Posadowski "Elec. Properties of Ti-Si-N Thin Cermet Films Dep in a Triode Sputtering System with a Hot Cathode" Thin Solid Films, 162(1988) pp. 111-117.

Quinto et al "High Temp. Microhardness of Hard Coatings Produced by Physical & Chem. Vap. Deposition" Thin Solid Films, 153(1987) pp. 19-36.

*Primary Examiner*—A. A. Turner
*Attorney, Agent, or Firm*—James C. Simmons; William F. Marsh

[57] ABSTRACT

Graphite carbon surfaces are protected from elevated temperature oxidation and mechanical wear by electric arc thermal spray coating exposed surfaces with a titanium nitride or multi-element (e.g., aluminum-silicon-titanium) coating.

2 Claims, 1 Drawing Sheet

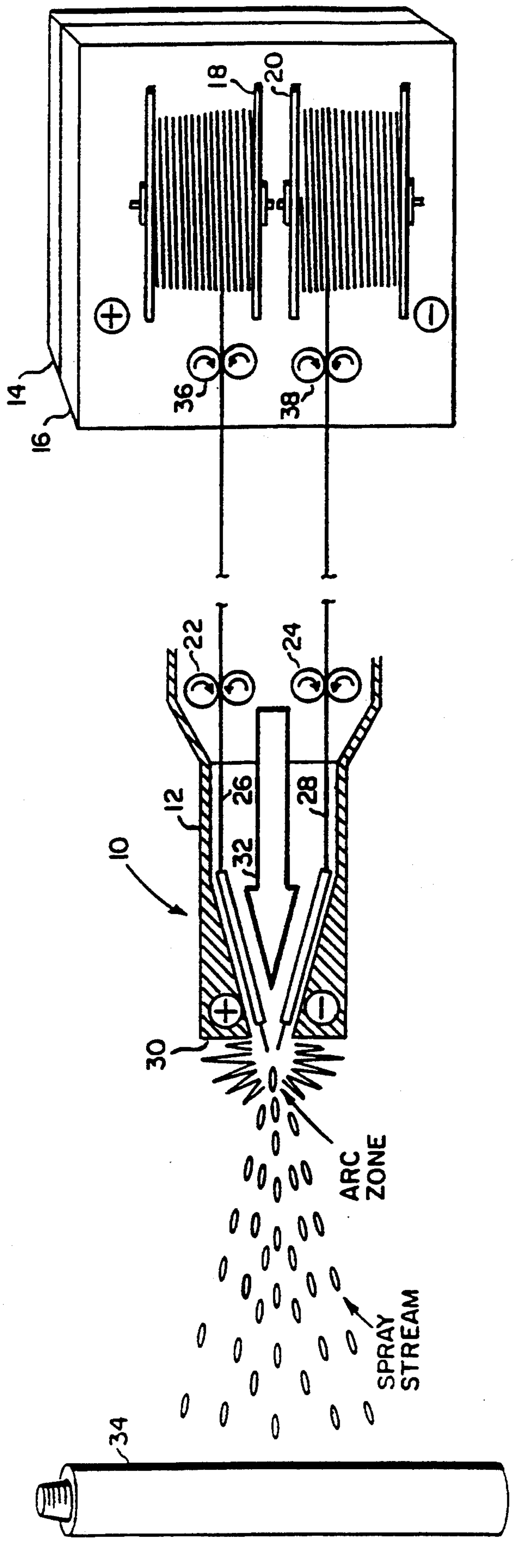
18
20
14
16
36
38
22
24
12
26
28
10
32
30
ARC ZONE
SPRAY STREAM
34

GRAPHITE/CARBON ARTICLES FOR ELEVATED TEMPERATURE SERVICE AND METHOD OF MANUFACTURE

This is a division of application Ser. No. 07/715,169 filed Jun. 14, 1991 now U.S. Pat. No. 5,254,359 which is a division of application Ser. No. 07/360,564 filed Jun. 2, 1989 now U.S. Pat. No. 5,304,417.

FIELD OF THE INVENTION

The present invention pertains to graphite/carbon shapes such as furnace electrodes and electrical contact devices, e.g. brushes, which are heated during use and to prolong the life of such devices.

BACKGROUND OF THE INVENTION

Graphite/carbon shapes such as electrodes for use in the conventional electric arc furnace and sliding contact devices such as brushes used in electric motors and the like are heated during use. The heating causes the carbon to react with oxygen in the atmosphere to form gaseous carbon monoxide and carbon dioxide, the reaction providing for deterioration of the graphite/carbon article beyond that caused by normal process consumption.

Over the last 20 years numerous researchers have addressed the problem of providing oxidation resistant coatings for graphite/carbon substrates. Particular emphasis has been placed on providing these coatings for graphite electrodes for use in the electric arc furnace. Prior attempts at solving the problem centered around depositing either silicon or silicon carbide coatings by a plasma spray or chemical vapor deposition process on the major cylindrical surface of the electrode. Other coatings involve using a silicon carbide slurry which is painted on and allowed to dry.

A paper titled "Recent Developments of Electric Arc Furnace Electrode Evaluation Protection at Armco, Inc.," by P. Shcroth, B. H. Baker presented at the First European Electric/Steel Congress Sep. 12–14, 1983, in Aachen, West Germany, summarizes the use of a coating (not defined) that is non conductive and can be sprayed or brushed on furnace electrodes. The coating resulted in savings of electrode material of between 10 and 20%. However, since the coating is non-conductive, it must be applied below the electrical clamp at the mill before the electrode is positioned for use in the arc furnace, thus requiring significant capital expense and changes in current operating practice for the electric arc furnace shop.

A paper by J. H. Courtenay and J. Helmut, titled "Lower Electrode Consumption Through Reduced Sidewall Oxidation", published in Fachberichte Huttenpraxts Metallweitervera bettung Volume 23, No. 10, 1985, provides a review of three techniques used to reduce sidewall oxidation of large electric arc furnace electrodes. The techniques include precoating, water cooling and in situ coating, the later coating technique called Platol. The coating system Is fully automatic with a robot spray applicator and is installed on the furnace and places a fusible glass matrix onto the electrode. The coating material consists primarily of silicon carbide and resulted in graphite savings of between 14 and 22 percent, with a net saving after costs reported to be approximately 10% of the graphite cost. The coating is non-conductive and requires a high capital investment in equipment.

An article by S. Dallaire appearing in "Surface and Coatings Technology", Volume 32, 1987, pages 141–142, discloses the use of a plasma coating technique to coat graphite electrodes. The powdered materials used to form the coating were aluminum, silicon carbide, titanium, and titanium carbide. The titanium-titanium carbide powders are sprayed first to a thickness of 50 micrometers to achieve a good bond. Then the aluminum-silicon carbide powders are sprayed to a thickness of 700 micrometers. The resulting coating was sensitive to temperatures above 800° C. and thus did not remain Intact below the roof of the furnace. The main conclusion is that an adherent $AL_4SiC_4$ layer in close contact with graphite provided the protection.

Other attempts have been made to coat graphite steel electrodes with very thick aluminum based materials by a plasma deposition process. The coatings 1 to 2 millimeters in thickness, reportedly decreased the wear of an electrode resulting from oxidation between 25 and 30% without negative effects on thermal or electrical properties.

A German published patent application 3609359 (20 Mar. 1986) discloses a coating process using plasma spray techniques in a vacuum chamber for electrodes. The process of the application uses silicon deposition to approximately 0.1 millimeters. The graphite electrode must be sandblasted using an inert gas and a controlled atmosphere must be employed during the lengthy cooling cycle to assure integrity of the coating.

Japanese published patent application (83/224281) discloses using an unidentified method to spray a powder mixture of SiC, $Si_3N_4$-phosphate —$Cr_2O_3$—TaC, $AlAl_2O_3$ in a glass ($ZrO_2$-$SiO_2$—MgO—$FeZO_3$) along with copper, nickel, stainless steel, iron, tin powder onto graphite electrodes. According to applicants, service life of the coated electrodes was increased by 11.7%. It is believed that a service life greater than 15% is necessary in order for any coating to be viable.

U.S. Pat. No. 1,098,794 discloses and claims deposition of titanium oxide or titanium oxide plus carbon and binders on a carbon substrate such as a furnace electrode, followed by baking at high temperature in the presence of nitrogen to convert the deposit into a titanium nitride coating. The post deposition operation in which the entire electrode must be uniformly heated in a nitrogen atmosphere prior to use, consumes time and energy and is capital and labor intensive.

U.S. Pat. No. 3,852,107 discloses and claims providing a thick coating comprising 15 and 90 wt % of a matrix material, having a melting point greater than 1,000° and 10 to 85 wt % of a refractory filler which is electrically non-conductive and can be applied to the graphite electrode only below the electrode clamps. The coating must be reapplied every two hours or whenever the electrodes are moved down into the furnace, requiring work on hot furnace electrodes which are already installed in the furnace. Alternatively, the coatings can be prefabricated and applied as sheets which must be glued to the electrode.

U.S. Pat. Nos. 3,939,028; 4,301,387; 4,439,491; 4,567,103; 4,711,666: 4,772,514 and 4,487,804 disclose and claim various attempts at coating graphite/carbon electrodes for use in the electric arc furnace and are indicative of attempts to solve the troublesome problem of excessive electrode oxidation and/or mechanical wear at elevated temperatures.

SUMMARY OF THE INVENTION

In order to provide a coated graphite/carbon article that will resist elevated temperature oxidation and mechanical wear, it was discovered that a titanium nitride coating can be applied by the electric arc thermal spray process, wherein nitrogen was used as the propelling (atomizing) gas. Preparing graphite/carbon articles in this manner resulted in a uniform, electrically conductive oxidation and wear resistant coating consisting of primarily titanium nitride as deposited on the graphite article. The titanium nitride coating was formed by using a source of titanium metal (e.g., technical grade titanium wire) in the electric arc thermal spray process, which was melted by the effect of the arc atomized using nitrogen gas and carried to the substrate utilizing the nitrogen gas as the propellant. During the aerial traverse of the atomized titanium reaction with the nitrogen gas formed the titanium nitride compound which was uniformly deposited on the substrate.

Alternatively, a multi-element or Binary coating using the electric arc thermal spray process with nitrogen as the propelling (atomizing)gas can be deposited utilizing titanium metal as one wire and a pure metal or pre-alloyed metal that will form a protective oxide coating as the other wire with similar results.

Articles of the present invention show extended service life at elevated temperature, improved physical characteristics and result in cost savings to the user.

BRIEF DESCRIPTION OF THE DRAWING

The single figure of the drawing is a schematic representation of a typical electric arc spray system employed to make the articles and practice to process of the present invention.

DETAILED DESCRIPTION OF THE PREFERRED EMBODIMENT

The electric arc furnace process is a technology for melting and refining steel, especially scrap steel using precisely controlled electrical current. The electrical current passes through arcs from graphite electrodes suspended above the metal charge in the furnace. It is estimated that approximately 187 million tons of steel were produced during 1987 using the electric arc furnace process. The electric arc furnace is the basic process used by mini-mills for products such as bar, wire rod and castings of carbon steel, as well as the production of alloy, stainless ant tool steels.

Graphite electrodes range in diameter from ¼ inch to 30 inches and from 24 inches to 7 feet in length. Electrodes are produced from graphite because of its infusibility, chemical inertness to the process equipment, electrical conductivity, mechanical strength, and exceptional resistance to thermal shock. Consumption of the electrode depends upon the efficiency of the operation, but typically ranges from 7 to 15 pounds of electrode per ton of steel melted.

Electrode consumption takes place both at the tip (arc zone) and along the sidewalls. The oxidation and pulverization in the arc zone is responsible for only about 12% of the electrode consumption. The greatest loss (70%) is due to oxidation of the side of the electrode as it is exposed to high temperatures in the furnace. The remaining 18% is due to breakage of the electrode either when it is being mounted and slipped through the clamps or during the melting operation. Using the industry average electrode consumption rate of 10 pounds of electrode per ton of steel, this means that 7 pounds of electrode is lost to oxidation.

As set out above, numerous attempts have been made to prolong the electrode life by coating the electrode.

In view of the fact that titanium is a carbide former and titanium nitrogen compounds adhere to graphite substrates, and such coatings would react to process temperatures to provide improved temperature protection to the formation of titanium based oxide films and glasses, application of such coatings in an efficient and cost effective manner was the focus of a research program.

After several processes were evaluated, the electric arc spray system was selected and modified in order to achieve the articles and process of the present invention. As shown in the drawing figure, the arc spray system 10 includes an arc gun 12, a constant voltage power source 14, a control console 16 and a wire feed device represented by wire spools 18 and 20 respectively.

The arc spray gun 12 includes two sets of feed rollers 22, 24 to move separate wires 26, 28 respectively, through the gun to the nozzle end 28, where due to electrical current of different polarities (e.g., as shown in the drawing) an arc is struck between the wires 26 and 28. As the wires melt due to the influence of the electrical arc, compressed nitrogen gas is introduced into the arc gun 12 as shown by the arrow 32. The nitrogen gas exits the nozzle 30, where it causes the molten metal to be broken up into a stream of droplets. The compressed gas, in addition to atomizing the metal, propels the atomized metal (spray stream) toward a substrate 34, such as a conventional electric arc furnace electrode 34. During the aerial traverse of the atomized titanium reaction with nitrogen forms a titanium nitride compound.

The electrode 34 can be mounted vertically or horizontally and either it or the arc gun 12 can be oscillated to provide a uniform coating over the length of the electrode.

Wire feeders 18 and 20 can also include a pair of rollers 36, 38 to help feed the wire from the spools to the gun 12. The feed rolls in the gun and the wire feeds can either push, pull or use a combination of both techniques to move the wire through the arc gun.

A series of electrodes were coated using the process depicted in the drawing. The wire used in coating the electrodes was technical grade titanium wire (unalloyed) designated Grade 2 by the American Society for Testing Materials. While Grade 2 wire is the least expensive grades 1, 3, 4 and 7 (as designated by the ASTM and identified in Section 9, Metals Handbook, Ninth Edition, Vol. 3, 1985) could also be used. The electric arc spray gun used for these experiments was a Model 8830 supplied by Tafa, Inc., of Bow, (Concord), N.H. Other electric arc spray guns such as a type 4RG supplied by Metco, Inc., of Nestbury, N.Y. would also be suitable. Two separate titanium wires are fed at a constant rate of about 110 inches per minute into the gun 12, where they are arced to across a potential difference of 33 volts and 160 amperes. At the same time, nitrogen gas supplied at 93 psig atomizes the stream of molten metal. The molten titanium reacts with the nitrogen in flight to form titanium nitride.

The electrodes are laid horizontally and rotate at a speed of 1.6 rpm. The arc gun was mounted out at a standoff distance of 7 inches, while the horizontal traverse speed of the gun was maintained at 31 inches per minute. Under these conditions, about 0.002 inches of coating were deposited per pass. A total of 5 passes were made on each electrode to achieve an overall thickness of 0.01 inches.

While the standoff distance was maintained at 7 inches ideally, and this will depend upon the other process conditions, the standoff distance need only be far enough away so that the arc does not cause unnecessary heating of the substrate.

The gas pressure can be from 10 psig to 120 psig with a range for the equipment used in the examples of the invention being between 60 and 90 psig. The current could range from 50 to 300 amperes, however with the equipment used in the example of the present invention the current should be maintained between 100 and 250 amps. Below 100 amps the arc tends to be unstable and above 250 amps the conversion to the titanium nitride compound may not be complete. Redesigning the arc spray gun, using thinner wire or auxiliary chambers could allow the operator to use lower pressure and different current levels.

A series of electrodes treated according to the foregoing procedure were tested against uncoated electrodes in a commercial electric arc furnace. 69.8 tons of steel were melted consuming 903 pounds of uncoated electrodes, resulting in a consumption of 12.94 pounds of electrode per ton. Thereafter, six coated electrodes were used in the furnace to melt 151.641 tons of steel with 1,168 pounds of electrode being consumed, resulting in a electrode consumption of 7.7 pounds of electrode per ton of steel melted. This results in a 41% improvement in the consumption of the electrode for the coated electrode versus the uncoated electrode.

Thus, it can be seen that invention which substitutes high purity nitrogen for air as the propelling gas in the conventional electric arc thermal spray process, permits nitridation of the titanium while minimizing oxidation. The simplicity and low cost of the electric arc process, performed without the need of an atmosphere chamber or furnace provides immediate benefits for the user, since the electrodes can be easily coated. Once coated with the titanium-nitrogen compound, or titanium containing materials, the electrode possesses high temperature oxidation resistance at steel making temperatures and increased wear resistance in the sliding contact (brush applications), this later point being shown since electrodes have to be adjusted in the holders on the electric arc furnace. The use of the electric arc thermal spray coating process allows for fast, inexpensive deposition of coatings.

The use of nitrogen opposed to air as a propellant allows for in-flight creation of a largely titanium nitride coating that exhibits high hardness (wear resistance) and high adhesion to the graphite surface. The titanium nitride coating provides oxidation protection to the graphite electrodes and oxidation as well as wear resistance to graphite brushes for use in motors, alternators and the like. Unlike the numerous oxide coatings suggested in the prior art, the titanium nitride coating is electrically conductive and does not reduce efficiency of the coated electrode.

The process of the present Invention also lends itself to producing coatings of titanium-nitrogen and other pure metals or alloys. For example, the electric arc spray gun can be set up to use a titanium wire on one spool and another pure metal or pre-alloyed metal that will form a protective oxide coating (e.g., aluminum-silicon) on the other.

In conventional arc-spraying, both the negative and positive wires are identical. Hence, two identical alloyed wires will be used if an alloyed coating Is required. This Is the common practice, there being no advertised or other published information on commercial or research arc-spraying processes where two different wires are used for spraying.

The problem with alloyed (especially ternary and higher) wires is their cost. The economic option for alloyed coatings would be to deposit them using simpler feed wire chemistry and create in-situ alloys. If wire A is sprayed together with wire B, the process would be expected to form an A-B alloy deposit at a cost that Is lower than for the spraying of two A-B pre-alloyed wires. The problem with spraying two different (simple) wires for alloyed coatings is the current lack of relevant technical know-how references, handbooks, prior-art, etc. This is because the process is more complex and requires two different feed rates for the different metal wires.

In developing the process of the present invention, two different coatings, e.g., TixN and Ti—Al—Si/$N_2$ "Binary" were tested. The first was produced by spraying two identical Ti wires using $N_2$ stream. The Ti—Al—Si/$N_2$ Binary coating involved the simultaneous spraying of Ti wire (negative) and Al—Si alloy wire (positive) using $N_2$ stream. In other words, a TI—Al—Si—N coating using wires that were not Ti—Al—Si alloys were produced. This achieved an in-situ alloy coating at a cost reduction.

It was discovered the best mode to deposit this "Binary" coating on a graphite substrate is to always make the Ti wire negative (and the Al—Si wire positive), and to feed the Ti wire into the gun at the rate which is higher than that for the Al—Si wire. If these conditions are met, the adhesion of "Binary" coatings to graphite is comparable to the high adhesion specifying the TixN coating, and the resultant coatings are compact and protect the substrate from oxidation.

The Binary coating technology may also be used for creating other and new metastable alloy coatings with desired properties offering a variety of potential applications, e.g., more active anti-corrosive coatings, catalysis. As pointed out in the above discussion, the coating can be TixN or Ti-based Ti—Al—Si/$N_2$ Binary, as well as a Ti—Al—Si/$N_2$ deposited traditionally using two identical Ti—Al—Si pre-alloyed wires.

A series of tests were run using titanium wire and an aluminum-silicon wire in the electric arc spray gun as shown in the drawing. The silicon content can be between 1 and 15% by weight of the wire. Graphite samples cut from a 2.25 inch outside diameter graphite rod were lightly blasted using 0.036 aluminum oxide with a nitrogen pressure of 30 psig and a 10 inch standoff distance before coating to develop a more aggressive (rougher) surface and therefore increase adhesion. A 0.78 inch diameter hole was drilled 1.75 inches into one end of the graphite sample to act as a thermal well, the diameter length and weight accurately measured before and after coating and again after testing for each sample.

The samples were mounted on a shaft inserted in the thermal well and then rotated. A chuck rotation speed of 238 revolutions per minute and a gun traverse speed of 180 inches per minute produced the most uniform coatings of titanium nitride with a standoff distance of between 5.5 and 6 inches and a standoff distance of 7 inches for the titanium-aluminum-silicon coatings. The atomizing pressure was set at 85 psig.

After coating the samples were subjected to heating in an induction furnace at 1300° C. for one hour, or cyclic oxidation tests in a box furnace, wherein the samples were heated up to 1300° C. and subjected to three heating and cooling cycles.

The tests showed that the coatings had very little effect in changing the resistivity of the bare graphite in the as sprayed condition. The titanium-aluminum/5% silicon binary coating essentially eliminated oxidation and is the best coating as far as oxidation resistance is concerned, however, it is limited by its mechanical properties, e.g., adhesion on spraying, wear resistance and impact resistance, which are less than exhibited by the titanium nitride coating which exhibited superior wear and impact resistance and acceptable oxidation resistance.

A series of tests were conducted using the same wires with air as the propellant/atomizing medium. In these tests the resistivity of the coatings were at unacceptable levels, indicating that the coatings were no longer conductive and would not be acceptable.

The electric arc spray process has not been seriously considered for use in the coating of graphite electrodes in the past, because the air in the process severely limits the type of metals that could be sprayed due to unwanted reaction of the feed wire with oxygen during spraying. In addition, the 21% oxygen in the air limited the amount of nitriding to provide significant titanium nitride in the final coating and limited the electrical conductivity of the coating as well as its adherence to the graphite/carbon substrate. Thus, as pointed out, most attempts were directed to more expensive coating techniques, such as that of plasma deposition, chemical vapor deposition and physical vapor deposition or the less effective methods of slurry paint. Plasma, chemical vapor deposition and physical vapor deposition prove to be too expensive while slurry paints only provided about 10% reduction in oxidation loss, due to their low temperature limits. Thus, the use of the electric arc spray system with titanium wire and nitrogen as detailed herein, prove to be an effective method for coating graphite/carbon substrates protect them from elevated temperature oxidation and mechanical wear. While several examples have been given for substrates, any substrate of a carbon/graphite nature can be treated with the method of the present invention.

Having thus described our invention what is desired to be secured by letters patents of the United States set forth in the appended claims.

We claim:

1. An electric arc furnace electrode comprising a generally elongated cylindrical graphite body having a first end with a projection adapted to securely mate with a complimentary shaped receptacle on a second end of another like electrode and a second end having said shaped receptacle therein, the major portion of the body coated with an electric arc thermal sprayed coating consisting essentially of titanium nitride said coating having a thickness of at least 0.002 inches with a ratio of titanium to nitrogen of between 1 and 2, said coating applied by electric arc thermal spraying of titanium wire in ambient air using nitrogen gas as the atomizing/-propelling gas.

2. An electric arc furnace electrode comprising a generally elongated cylindrical graphite body having a first end with a projection adapted to securely mate with a complementary shaped receptacle on a second end of another like electrode and a second end having said shaped receptacle therein, the major portion of the body coated with an electric arc thermal sprayed coating consisting essentially of a mixture of titanium nitride and titanium-aluminum-silicon nitride, said coating applied by electric arc thermal spraying of a titanium wire and wire of aluminum-silicon atomizing/propelling gas.

* * * * *